US012266289B2

(12) United States Patent
Hwang et al.

(10) Patent No.: US 12,266,289 B2
(45) Date of Patent: Apr. 1, 2025

(54) DISPLAY APPARATUS

(71) Applicant: LG Display Co., Ltd., Seoul (KR)

(72) Inventors: Ji-Yong Hwang, Paju-si (KR); Jong-Taek Kim, Paju-si (KR); Ki-Tae Yu, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 18/545,628

(22) Filed: Dec. 19, 2023

(65) Prior Publication Data

US 2024/0257693 A1 Aug. 1, 2024

(30) Foreign Application Priority Data

Jan. 27, 2023 (KR) ........................ 10-2023-0010977

(51) Int. Cl.
*G09G 3/20* (2006.01)
*G09G 3/3208* (2016.01)

(52) U.S. Cl.
CPC ......... *G09G 3/2055* (2013.01); *G09G 3/3208* (2013.01); *G09G 2310/066* (2013.01); *G09G 2310/08* (2013.01); *G09G 2320/0209* (2013.01); *G09G 2320/0686* (2013.01)

(58) Field of Classification Search
CPC ............... G09G 3/2055; G09G 3/3208; G09G 2310/066; G09G 2310/08; G09G 2320/0209; G09G 2320/0686
See application file for complete search history.

(56) References Cited

U.S. PATENT DOCUMENTS 10,229,641 B2 * 3/2019 Yang ...................... G09G 3/344
2003/0006994 A1 * 1/2003 Suzuki ................. G09G 3/2059 345/596
2003/0117489 A1 * 6/2003 Jones ................... H04N 13/324 348/E13.043
2007/0080927 A1 * 4/2007 Zhou ...................... G09G 3/344 345/107
2010/0053222 A1 * 3/2010 Kerofsky ............ G09G 3/3406 345/690
2011/0050752 A1 * 3/2011 Origuchi ............. G09G 3/2022 345/690
2012/0056911 A1 * 3/2012 Safaee-Rad ........... H04N 23/83 345/690
2014/0160174 A1 * 6/2014 Tsuei ....................... G09G 5/06 345/690

(Continued)

FOREIGN PATENT DOCUMENTS

CN 108597428 A * 9/2018 ............ G09G 3/006
CN 109712584 A * 5/2019

(Continued)

*Primary Examiner* — William Lu
(74) *Attorney, Agent, or Firm* — Birch, Stewart, Kolasch & Birch, LLP

(57) ABSTRACT

A display apparatus includes a display panel configured to display an image, an image analysis portion configured to calculate a crosstalk level when a crosstalk pattern exists in the image, and a dithering portion configured to set a dithering bit corresponding to the crosstalk level and perform a time dithering processing with the dithering bit on input image data located in a region where a crosstalk occurs by the crosstalk pattern, in order to generate compensation image data.

18 Claims, 6 Drawing Sheets

(56) References Cited

U.S. PATENT DOCUMENTS

| | | | | |
|---|---|---|---|---|
| 2014/0192079 | A1* | 7/2014 | Lee | G09G 3/2003<br>345/597 |
| 2015/0221248 | A1* | 8/2015 | Kim | G09G 3/3648<br>345/204 |
| 2017/0155895 | A1* | 6/2017 | Kroon | H04N 13/305 |
| 2019/0325816 | A1* | 10/2019 | Lin | G09G 3/3208 |
| 2019/0325821 | A1* | 10/2019 | Pyo | G09G 3/3208 |
| 2020/0035173 | A1* | 1/2020 | Kim | G09G 3/3688 |
| 2020/0265773 | A1* | 8/2020 | Fujii | G09G 5/10 |
| 2023/0103014 | A1* | 3/2023 | Chan | G09G 5/026<br>345/669 |
| 2023/0258811 | A1* | 8/2023 | Wise | G06T 7/521<br>702/156 |
| 2024/0087183 | A1* | 3/2024 | Hamer | G06T 11/001 |
| 2024/0282254 | A1* | 8/2024 | Lee | G09G 3/2003 |

FOREIGN PATENT DOCUMENTS

| | | | | |
|---|---|---|---|---|
| CN | 110390910 | A * | 10/2019 | G09G 3/2055 |
| CN | 116189627 | A * | 5/2023 | |
| CN | 118411933 | A * | 7/2024 | G09G 3/2044 |
| DE | 112012000818 | B4 * | 3/2023 | G09G 3/20 |
| GB | 2336963 | A * | 11/1999 | G02B 27/2214 |
| JP | 11221967 | A * | 8/1999 | G03C 1/00 |
| TW | 201630387 | A * | 8/2016 | G06F 13/40 |
| WO | WO-9527972 | A1 * | 10/1995 | G09G 3/3625 |
| WO | WO-2022063000 | A1 * | 3/2022 | H04B 10/293 |

* cited by examiner

DISPLAY APPARATUS

CROSS REFERENCE TO RELATED APPLICATIONS

The present application claims priority to Korean Patent Application No. 10-2023-0010977 filed in Republic of Korea on Jan. 27, 2023, the entire contents of which is hereby expressly incorporated by reference into the present application.

BACKGROUND

Field

The present disclosure relates to a display apparatus that compensates for a low gray level crosstalk.

Discussion of the Related Art

As information society develops, demand for display apparatuses for displaying images has increased in various forms. As such, various flat display apparatuses such as organic light emitting display apparatuses and liquid crystal display apparatuses have been used.

The organic light emitting display apparatus has been widely used because it has advantages of small size, light weight, thinness, and low-power driving.

In the organic light emitting display apparatus, when a black luminance (or 0 gradation) region and a luminance region higher than the black luminance, which are a specific pattern, are displayed together in a horizontal line direction on a screen, a crosstalk can occur in the relatively high luminance region.

For crosstalk compensation, in a related art, gray levels (or bits) for the crosstalk occurrence region, which is the high luminance region, are uniformly adjusted regardless of gray level magnitude of image data.

However, when the gray levels of the crosstalk occurrence region are relatively low gray levels (e.g., $127^{th}$ gray level or less), a perceived luminance difference between the gray levels can be relatively large, so that a gray level change can be sensitively reflected. As a result, it can be difficult and challenging to compensate for the low gray level crosstalk.

SUMMARY OF THE DISCLOSURE

Accordingly, the present disclosure is directed to a display apparatus that substantially obviates one or more of the problems due to limitations and disadvantages of the related art.

An advantage of the present disclosure is to provide a display apparatus which can effectively compensate for a low gray level crosstalk.

Additional features and advantages of the disclosure will be set forth in the description which follows, and in part will be apparent from the description, or can be learned by practice of the disclosure. These and other advantages of the disclosure will be realized and attained by the structure particularly pointed out in the written description and claims hereof as well as the appended drawings.

To achieve these and other advantages and in accordance with the purpose of the present disclosure, as embodied and broadly described herein, a display apparatus includes a display panel configured to display an image; an image analysis portion configured to calculate a crosstalk level when a crosstalk pattern exists in the image; and a dithering portion configured to set a dithering bit corresponding to the crosstalk level, and perform a time dithering processing (also referred to herein as a time dithering process) with the dithering bit on input image data located in a region where a crosstalk occurs by the crosstalk pattern to generate compensation image data.

In another aspect of the present disclosure, a display apparatus includes a display panel configured to display an image, and a data compensation portion configured to perform a time dithering processing on input image data in a crosstalk occurrence region with a dithering bit which is set according to a crosstalk level in the image to generate compensation image data.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the disclosure and are incorporated in and constitute a part of this specification, illustrate embodiments of the disclosure and together with the description serve to explain the principles of the disclosure. In the drawings.

DETAILED DESCRIPTION OF THE EMBODIMENTS

Figure 1:
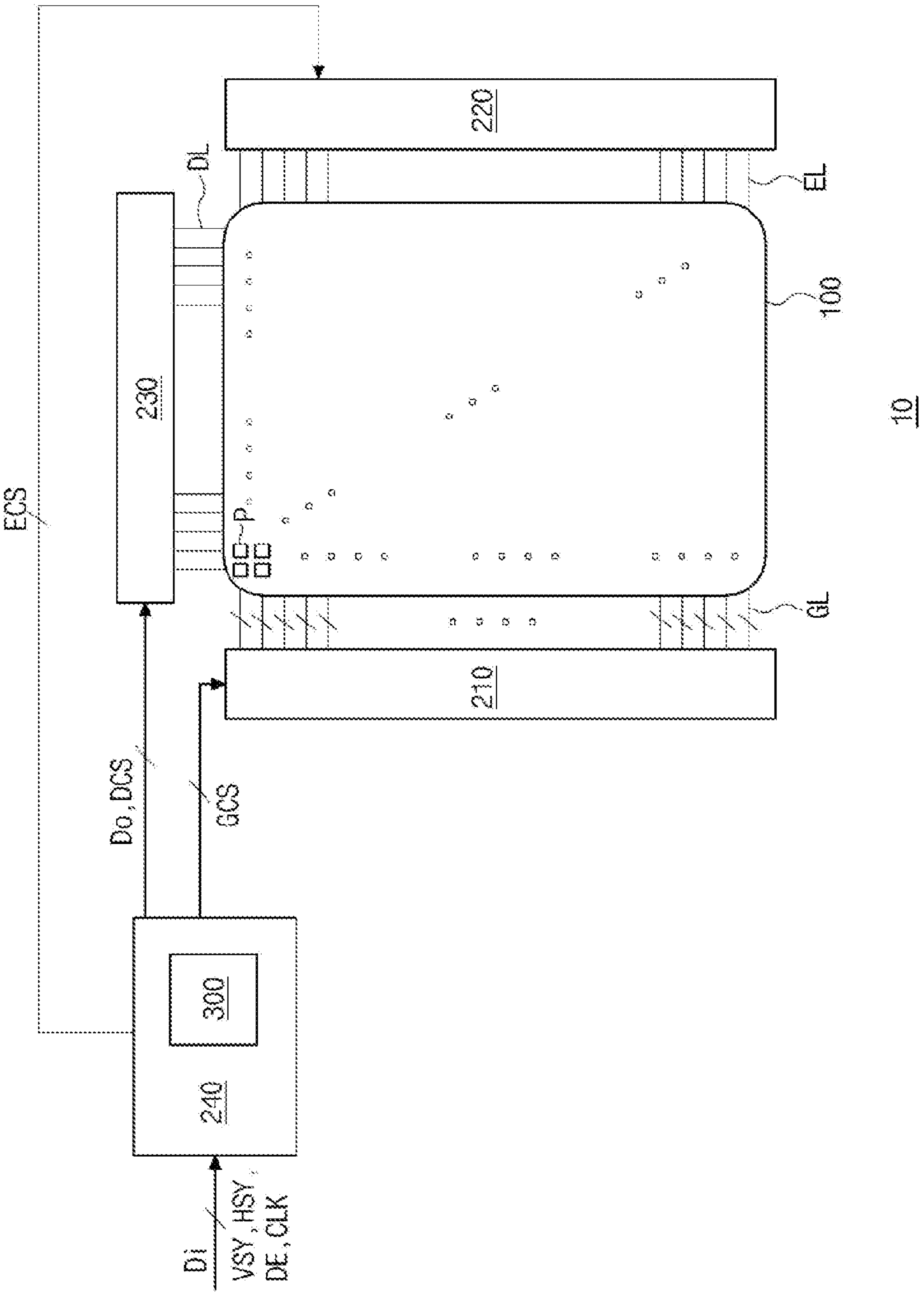
FIG. 1 is a view schematically illustrating a display apparatus according to an embodiment of the present disclosure.

Advantages and features of the present disclosure and methods of achieving them will be apparent with reference to the embodiments described below in detail with the accompanying drawings. However, the present disclosure is not limited to the embodiments disclosed below, but can be realized in a variety of different forms, and these embodiments only allow the present disclosure to be complete. These embodiments are provided to fully inform the scope of the disclosure to the skilled in the art of the present disclosure, and the present disclosure can be defined by the scope of the claims.

The shapes, sizes, proportions, angles, numbers, and the like disclosed in the drawings for explaining the embodiments of the present disclosure are illustrative, and the present disclosure is not limited to the illustrated matters. The same reference numerals refer to the same components throughout the description.

Furthermore, in describing the present disclosure, if it is determined that a detailed description of the related known technology unnecessarily obscure the subject matter of the present disclosure, the detailed description thereof can be omitted. When 'comprising', 'including', 'having', 'consisting', and the like are used in this disclosure, other parts can be added unless 'only' is used. When a component is expressed in the singular, cases including the plural are included unless specific statement is described.

In interpreting the components, even if there is no separate explicit description, it is interpreted as including a margin range.

In the case of a description of a positional relationship, for example, when the positional relationship of two parts is described as 'on', 'over', 'above', 'below', 'beside', 'under', and the like, one or more other parts can be positioned between such two parts unless 'right' or 'directly' is used.

In the case of a description of a temporal relationship, for example, when a temporal precedence is described as 'after', 'following', 'before', and the like, cases that are not continuous can be included unless 'directly' or 'immediately' is used.

In describing components of the present disclosure, terms such as first, second and the like can be used. These terms are only for distinguishing the components from other components, and an essence, order, sequence, or number of the components is not limited by the terms. Further, when it is described that a component is "connected", "coupled" or "contact" to another component, the component can be directly connected or contact to the another component, but it should be understood that other component can be "interposed" between the components.

Respective features of various embodiments of the present disclosure can be partially or wholly connected to or combined with each other and can be technically interlocked and driven variously, and respective embodiments can be independently implemented from each other or can be implemented together with a related relationship.

The terms such as a "line" or "direction" should not be interpreted only based on a geometrical relationship in which the respective lines or directions are parallel or perpendicular to each other, and can be meant as lines or directions having wider directivities within the range within which the components of the present disclosure can operate functionally. Further, term "portion" can be a part, a module, a device, an apparatus, a circuit, a structure, or the like.

The term "at least one" should be understood as including any and all combinations of one or more of the associated listed items. For example, the meaning of "at least one of a first item, a second item, and a third item" denotes the combination of all items proposed from two or more of the first item, the second item, and the third item as well as only one of the first item, the second item, or the third item.

Unless otherwise defined, the terms (including technical and scientific terms) used herein have the same meaning as commonly understood by one of ordinary skill in the art to which example embodiments belong. It is further understood that terms, such as those defined in commonly used dictionaries, should be interpreted as having a meaning that is, for example, consistent with their meaning in the context of the relevant art and should not be interpreted in an idealized or overly formal sense unless expressly defined otherwise herein.

The terms used herein have been selected as being general in the related technical field; however, there can be other terms depending on the development and/or change of technology, convention, preference of technicians, and so on. Therefore, the terms used herein should not be understood as limiting technical ideas, but should be understood as examples of the terms for describing example embodiments.

Hereinafter, embodiments of the present disclosure are described in detail with reference to the drawings. All the components of each display apparatus according to all embodiments of the present disclosure are operatively coupled and configured. Meanwhile, in the following embodiments, the same and like reference numerals are assigned to the same and like components, and detailed descriptions thereof can be omitted.

Figure 2:
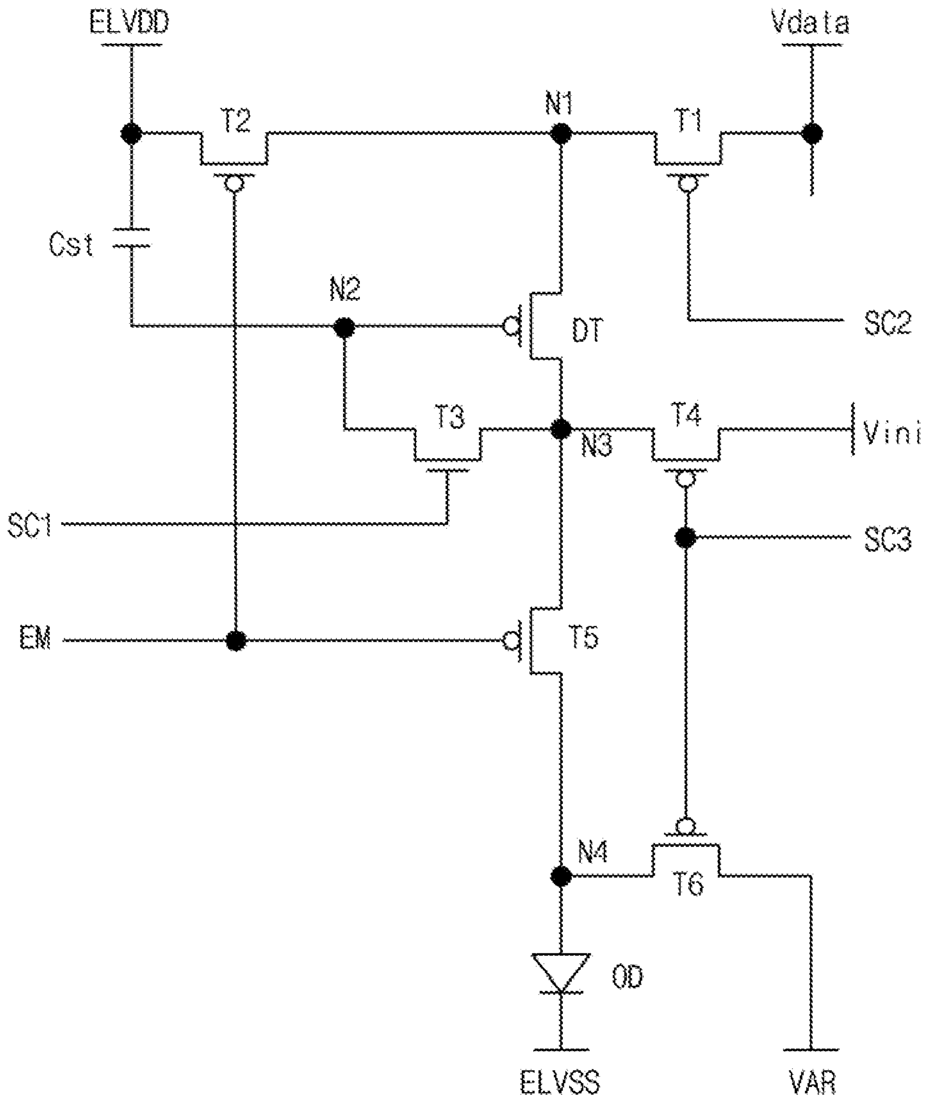
FIG. 2 is a circuit diagram schematically illustrating an example of a pixel according to an embodiment of the present disclosure.
Figure 3:
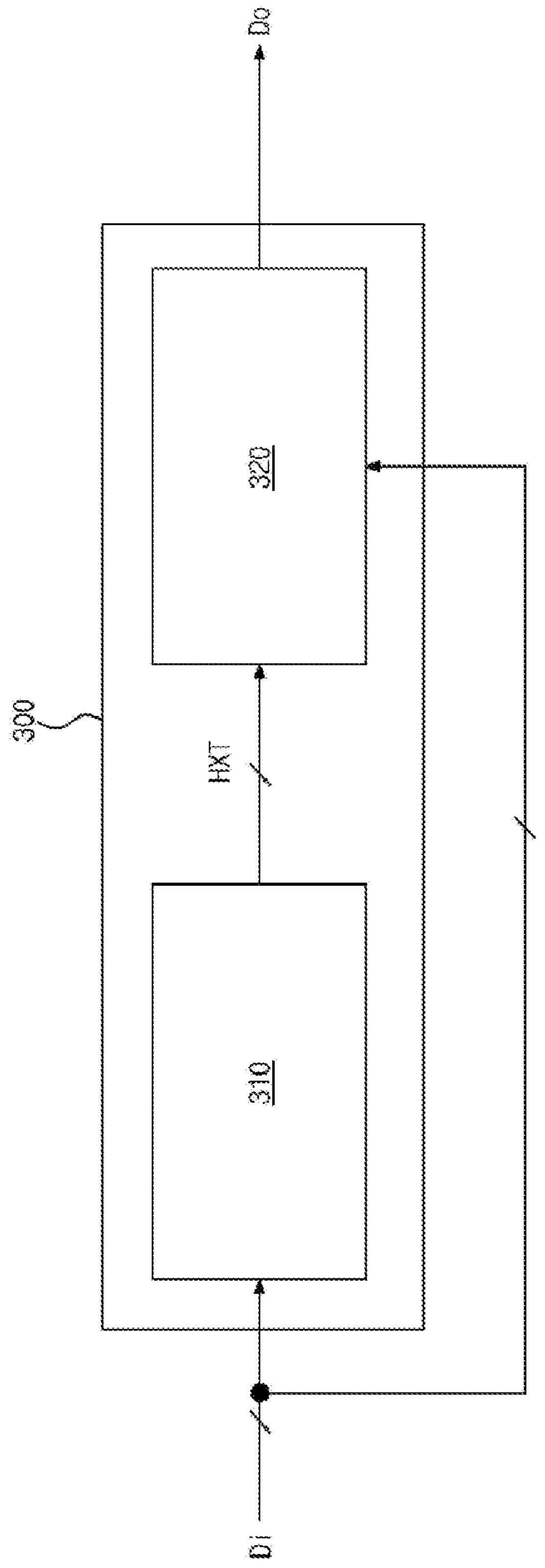
FIG. 3 is a block diagram schematically illustrating a configuration of a data compensation portion of a display apparatus according to an embodiment of the present disclosure.

FIG. 1 is a view schematically illustrating a display apparatus according to an embodiment of the present disclosure. FIG. 2 is a circuit diagram schematically illustrating an example of a pixel according to an embodiment of the present disclosure. FIG. 3 is a block diagram schematically illustrating a configuration of a data compensation portion of a display apparatus according to an embodiment of the present disclosure.

Prior to a detailed description, a display apparatus 10 according to this embodiment can include any display apparatus among all types of display apparatuses in which a crosstalk is caused, which can include an organic light emitting display apparatus and a liquid crystal display apparatus.

Meanwhile, for convenience of explanation, this embodiment is described by taking an organic light emitting display apparatus as the display apparatus 10 as an example.

Referring to FIGS. 1 to 3, the display apparatus 10 of this embodiment can include a display panel 100 and a driving circuit portion that drives the display panel 100. Here, the phrase "circuit portion" can be a driving circuit, a driver, etc.

The driving circuit portion can include, for example, a gate driving portion (or gate driver) 210, an emission driving portion (or emission driver) 220, a data driving portion (or gate driver) 230, and a timing control portion (or timing controller) 240.

Regarding the display panel 100, pixels P arranged in a matrix form along a plurality of horizontal lines (e.g., row lines) and a plurality of vertical lines (e.g., column lines) can be provided on a substrate of the display panel 100. Through light output from the plurality of pixels P arranged in this way, an image can be displayed on a screen (or display region or active region) of the display panel 100.

The plurality of pixels P can include pixels for displaying different colors, for example, red, green, and blue pixels that display red, green, and blue, respectively, but not limited thereto. For instance, the pixels P can be red, green, blue and white pixels.

In the display panel 100, various signal lines that transmit driving signals for driving the pixels P can be formed on a substrate.

In this regard, for example, a plurality of data lines DL for transmitting data signals (or data voltages), which are image signals, can extend along the vertical direction and be connected to the pixels P of the corresponding vertical lines.

In addition, a plurality of gate lines GL for transmitting gate signals (or gate voltages) can extend along the horizontal direction and be connected to the pixels P of the corresponding horizontal lines. In addition, a plurality of emission lines (or emission control lines) EL that transmit emission control signals (or emission control voltages) can extend along the horizontal direction and be connected to the pixels P of the corresponding horizontal lines.

In addition to the data line DL, gate line GL, and emission line EL, other signal lines can be provided.

The pixels P can be defined by the plurality of data lines DL, gate lines GL, and emission lines EL. Each pixel P can include a light emitting diode OD as a light emitting element, and a plurality of transistors and at least one capacitor for driving the light emitting diode OD.

Meanwhile, in this embodiment, for convenience of explanation, as shown in FIG. 2, a 7T1C structure in which the pixel P is equipped with seven transistors T1 to T6 and DT and one capacitor Cst is taken as an example. In FIG. 2, the pixel P located on a $n^{th}$ horizontal line is taken as an example.

Referring to FIG. 2, the pixel P can include a first transistor T1 to a sixth transistor T6, which are a plurality of switching transistors, a driving transistor DT, a storage capacitor Cst, and the light emitting diode OD.

Meanwhile, in FIG. 2, a case in which the first, second, fourth, fifth, and sixth transistors T1, T2, T4, T5, and T6 are formed of P-type transistors, the third transistor T3 is formed of a N-type transistor, and the driving transistor DT is formed of a P-type transistor is taken as an example, but not limited thereto.

The first to sixth transistors T1 to T6 and the driving transistor DT can include semiconductors made of the same material or can include semiconductors made of different materials. In this regard, for example, at least some of the first to sixth transistors T1 to T6 and the driving transistor DT can include one of a crystalline silicon layer, an oxide semiconductor layer, and an amorphous semiconductor layer.

Meanwhile, an oxide semiconductor has excellent off-current characteristics and can be suitable for a switching transistor, therefore at least one of the first to sixth transistors T1 to T6 can include an oxide semiconductor layer. Crystalline silicon has excellent mobility, therefore the driving transistor DT can include a crystalline silicon layer.

The gate signal provided to the $n^{th}$ horizontal line in FIG. 2 can be output from a $n^{th}$ stage of the gate driving portion 210. For example, three gate signals can be provided to the $n^{th}$ horizontal line, and for convenience of explanation, the three gate signals are referred to as first, second, and third gate signals SC1, SC2, and SC3. In this case, three gate lines GL for transmitting the three gate signals can be disposed on the $n^{th}$ horizontal line.

A gate of the first transistor T1 can be supplied with the second gate signal SC2. A source of the first transistor T1 can receive the data voltage Vdata transmitted through the corresponding data line DL. A drain of the first transistor T1 can be connected to a source of the driving transistor DT at a first node N1. The first transistor T1 can be turned on by the second gate signal SC2 and supply the data voltage Vdata to the source of the driving transistor DT.

A gate of the second transistor T2 can receive the emission control signal EM of the corresponding horizontal line. A source of the second transistor T2 can receive a high potential driving voltage ELVDD. A drain of the second transistor T2 can be connected to the first node N1. This second transistor T2 can be turned on by the emission control signal EM to supply the high potential driving voltage ELVDD to the source of the driving transistor DT.

A gate of the third transistor T3 can receive the first gate signal SC1. A source of the third transistor T3 can be connected to the drain of the driving transistor DT at a third node N3. A drain of the third transistor T3 can be connected to the gate of the driving transistor DT at a second node N2. The third transistor T3 can be turned on by the first gate signal SC1, so that a threshold voltage of the driving transistor DT can be sampled.

A gate of the fourth transistor T4 can receive the third gate signal SC3. A source of the fourth transistor T4 can receive an initialization voltage Vini. A drain of the fourth transistor T4 can be connected to the third node N3. The fourth transistor T4 can be turned on by the third gate signal SC3 and supply the initialization voltage Vini to the drain of the driving transistor DT.

A gate of the fifth transistor T5 can receive the emission control signal EM. A source of the fifth transistor T5 can be connected to the third node N3. A drain of the fifth transistor T5 can be connected to an anode of the light emitting diode OD at a fourth node N4. The fifth transistor T5 can be turned on by the emission control signal EM to provide a driving current (or emission current) to the anode of the light emitting diode OD.

A gate of the sixth transistor T6 can receive the third gate signal SC3. As another example, the gate of the sixth transistor T6 can receive a third gate signal of the next horizontal line. A source of the sixth transistor T6 can receive an anode reset voltage VAR. A drain of the sixth transistor T6 can be connected to the anode of the light emitting diode OD at the fourth node N4. The sixth transistor T6 can be turned on by the third gate signal SC3 to supply the anode reset voltage VAR to the anode of the light emitting diode OD.

The gate of the driving transistor DT can be connected to the drain of the third transistor T3 at the second node N2. The drain of the driving transistor DT can be connected to the source of the third transistor T3 and the source of the fifth transistor T5 at the third node N3. The source of the driving transistor DT can be connected to the drain of the first transistor T1 and the drain of the second transistor T2 at the first node N1. The driving transistor DT can be turned on according to the data voltage Vdata and allow the driving current to flow to the light emitting diode OD.

A first electrode of the storage capacitor Cst can be supplied with the high potential driving voltage ELVDD. A second electrode of the capacitor Cst can be connected to the gate of the driving transistor DT at the second node N2. The storage capacitor Cst can store the voltage of the gate of the driving transistor DT.

The anode of the light emitting diode OD can be connected to the drain of the fifth transistor T5 and the drain of the sixth transistor T6 at the fourth node N4. A cathode of the light emitting diode OD can receive a low potential driving voltage ELVSS. The light emitting diode OD can emit light with a corresponding luminance corresponding to the driving current provided through the driving transistor DT.

The 7T1C structure of the pixel P described above is an example, and the pixel P of this embodiment can have a different structure.

Referring again to FIG. 1, the gate driving portion 210 can receive a gate control signal GCS from the timing control portion 240, generate the gate signals, and sequentially apply the gate signal to the plurality of gate lines GL. For example, the gate voltages can be sequentially output in the vertical direction from top to bottom in the drawing.

The gate driving portion 210 can be configured to include at least one gate IC. In this case, the gate IC of the gate driving portion 210 can be mounted on a flexible circuit film and connected to a non-display region on a corresponding side of the display panel 100, or can be directly mounted on the non-display region.

As another example, the gate driving portion 210 can be formed directly on the substrate of the display panel 100 in a GIP (gate-in panel) type. For example, in processes of forming elements of the display panel 100, the gate driving portion 210 can be formed.

The emission driving portion 220 can receive an emission driving control signal ECS from the timing control portion 240, generate the emission control signals EM, and sequentially apply the emission control signals EM to the emission lines EL. For example, the emission control signals EM can be sequentially output in the vertical direction from the top to the bottom in the drawing.

The emission driving portion 220 can be configured to include at least one emission IC. In this case, the emission IC of the emission driving portion 220 can be mounted on a flexible circuit film and connected to a non-display region on a corresponding side of the display panel 100, or can be directly mounted on the non-display region.

As another example, the emission driving portion 220 can be formed directly on the substrate of the display panel 100 in a GIP (gate-in panel) type. For example, in processes of forming elements of the display panel 100, the emission driving portion 220 can be formed.

The data driving portion 230 can receive image data (or output image data or compensated image data or second image data) Do and a data control signal DCS from the timing control portion 240, and in response to the data control signal DCS, can convert the image data Do into data voltages, which are analog image data, and then output the data voltages to the corresponding data lines DL by horizontal line.

The data driving portion 230 can be configured to include at least one data IC (integrated circuit). In this case, the data IC of the data driving portion 230 can be mounted on a flexible circuit film and connected to a non-display region on a corresponding side of the display panel 100, or can be directly mounted on the non-display region.

Meanwhile, at least two of the above-described gate driving portion 210, emission driving portion 220, and data driving portion 230 can be configured to be integrated. For example, the gate driving portion 210 and the emission driving portion 220 can be configured in a form of an integrated circuit.

The timing control portion 240 can receive image data (or input image data or first image data) Di and various timing signals VSY, HSY, DE and CLK from an external host system through an interface such as a Low Voltage Differential Signaling (LVDS) interface, a Transition Minimized Differential Signaling (TMDS) interface, or the like. Using the timing signals, the timing control portion 240 can generate and output the data control signal DCS, the gate control signal GCS, and the emission driving control signal ECS to the data driving portion 230, the gate driving portion 210, and the emission driving portion 220, respectively.

Moreover, the timing control portion 240 can include a data compensation portion (or image compensation portion or image quality processing portion) 300 configured to compensate for a horizontal crosstalk, which is caused when a crosstalk pattern is displayed on the display panel 100, using a time dithering method 300.

In this regard, according to a crosstalk level (or crosstalk inducing level or crosstalk intensity) HXT of the crosstalk pattern, a gray level of the image data Di can be time-divided on a frame-by-frame basis with a bit of resolution corresponding to the crosstalk level HXT and then applied to the crosstalk occurrence region (or crosstalk compensation region).

Due to a nature of the time dithering method, the time dithering method can enable detailed and natural (or smooth) gradation expression (or luminance expression), so crosstalk can be compensated in a detailed and natural way, thereby improving a crosstalk compensation ability.

Furthermore, when a region where the crosstalk occurs has relatively low gray levels (for example, when a maximum gray level that the image data can express is $255^{th}$ gray level, the low gray levels are $127^{th}$ gray level or lower which is approximately 50% or less of the maximum gray level), a change in gray level can be perceived sensitively, so that compensating for the low gray level crosstalk can be difficult and challenging in reality.

However, in this embodiment of the present disclosure, the crosstalk compensation can be performed using the time dithering method, so that the low gray level crosstalk can be effectively compensated.

The crosstalk compensation of the bit-division time dithering method as above according to one or more embodiments of the present disclosure is described in more detail below.

First, the crosstalk level according to this embodiment of the present disclosure is described.

Figure 4:
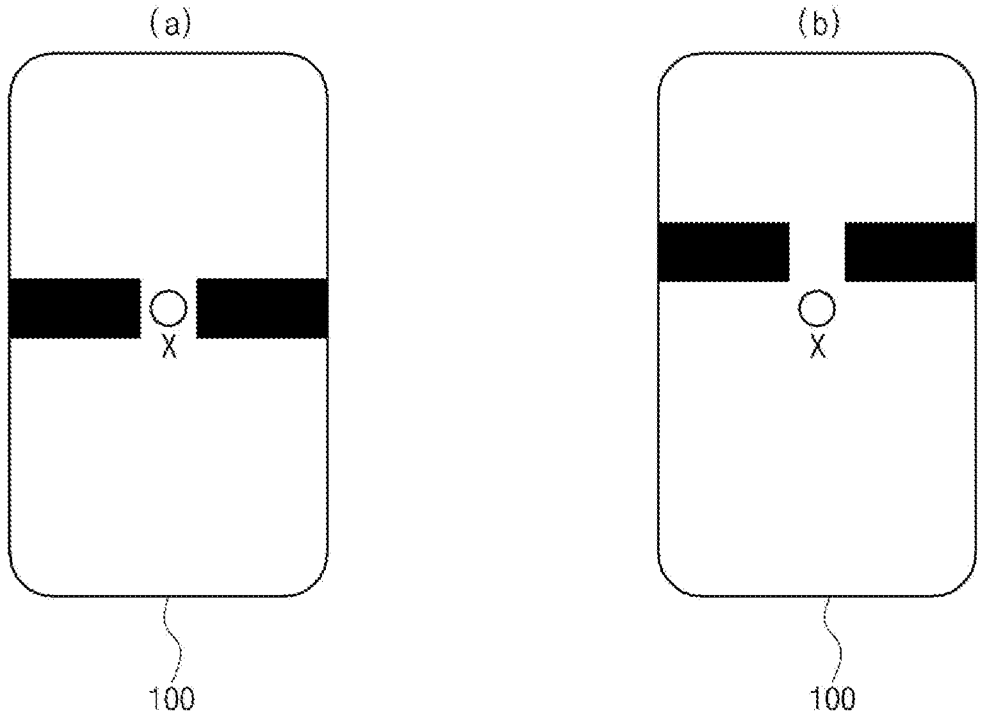
FIG. 4 is a view schematically illustrating a method for measuring a crosstalk level according to an embodiment of the present disclosure.

FIG. 4 is a view schematically illustrating a method for measuring a crosstalk level according to an embodiment of the present disclosure.

Here, (a) of FIG. 4 shows a case where a point X (i.e., a point indicated by a circle in the drawing), which is one point of the display panel 100, is located within a region where a crosstalk pattern is displayed, and a crosstalk occurs (or has occurred) at the point X due to the crosstalk pattern.

Meanwhile, (b) of FIG. 4 shows a case where the point X is located outside the region where the crosstalk pattern is displayed, for example, in a region below the crosstalk pattern, and in this case, the crosstalk does not occur at the point X. When displaying the image of (a) of FIG. 4, a luminance Ia at the point X is measured, and when displaying the image of (b) of FIG. 4, a luminance Ib at the point X is measured. Thereafter, the crosstalk level HXT (its unit is %) can be measured according to equation (1) below.

$$HXT(\%)=(Ia-Ib)/Ib*100. \quad \text{Equation (1):}$$

Through equation (1), the crosstalk level HXT in percentage can be measured. The crosstalk level HXT can be obtained, for example, in advance through a crosstalk test after manufacturing the display panel 100. In other words, the crosstalk level HXT generated according to the crosstalk pattern can be prepared in advance.

Accordingly, in driving the display apparatus 10, when a crosstalk pattern exists by analyzing an input image, the crosstalk level HXT for this crosstalk pattern can be calculated. The crosstalk level HXT for each crosstalk pattern can be defined, for example, as a lookup table LUT.

Next, the data compensation portion 300 that implements the bit-division time dithering method according to the crosstalk level of this embodiment is described with reference to FIG. 3.

The data compensation portion 300 can include, for example, an image analysis portion (or image data analysis portion) 310 and a dithering portion 320. The input image data Di can be provided, for example, in parallel to the image analysis portion 310 and the dithering portion 320.

The image analysis portion 310 can receive the input image data Di, analyzes the image, determines whether a crosstalk pattern exists, and calculates the crosstalk level HXT if the crosstalk pattern exists.

Here, in relation to calculating the crosstalk level, as mentioned above, a lookup table (LUT) in which the crosstalk level is matched with the corresponding crosstalk pattern in a form of a table can be referenced.

Accordingly, when the crosstalk pattern is detected through the image analysis, the image analysis portion 310 can refer to the lookup table to calculate the crosstalk level HXT corresponding to the detected crosstalk pattern.

The dithering portion 320 can receive the crosstalk level HXT output from the image analysis portion 310, and can perform the time dithering on the image data Di, which are located in the crosstalk occurrence region within the image in which the crosstalk pattern is displayed, to generate the compensation image data Do. The compensation image data Do generated in this way can be output to the data driving portion 230 and then be applied from the data driving portion 230 to the corresponding pixels P.

Regarding the time dithering processing of the dithering portion 320, for example, the dithering portion 320 can first set (or calculate) a dithering bit of resolution corresponding to the crosstalk level HXT input thereto.

In this regard, as the crosstalk level HXT (or an absolute value of the crosstalk level HXT) increase, a number of the dithering bit can increase, and conversely, as the crosstalk level HXT decrease, a number of the dithering bit can decrease.

For example, when the crosstalk level HXT (or its absolute value) is Y %, the same number of Y bits can be produced as the dithering bit. In other words, when the crosstalk level HXT is 1%, the dithering bit can be 1 bit, and when the crosstalk level HXT is 2%, the dithering bit can be 2 bits.

In this way, the dithering bit can be determined corresponding to the magnitude of the crosstalk level HXT.

Here, the crosstalk level HXT generally occurs in a range of 33%, it is desirable for the dithering bit to also be up to 3 bits, but not limited thereto.

When the dithering bit is set as above, the dithering portion 320 can dither the gray level in a form of repeating rise and fall (or fall and rise) step by step by one gray level within a gray level range (or a number of gray level) that can be expressed by the set dithering bit, and can sequentially output the dithered compensation image data Do by frame.

In other words, for example, based on the gray level of the input image data Di, image data with gray levels divided step by step over time within the gray level range of the dithering bit can be sequentially output as the compensation image data Do frame by frame.

The bit-division time dithering compensation operation is described using specific examples.

Figure 5:
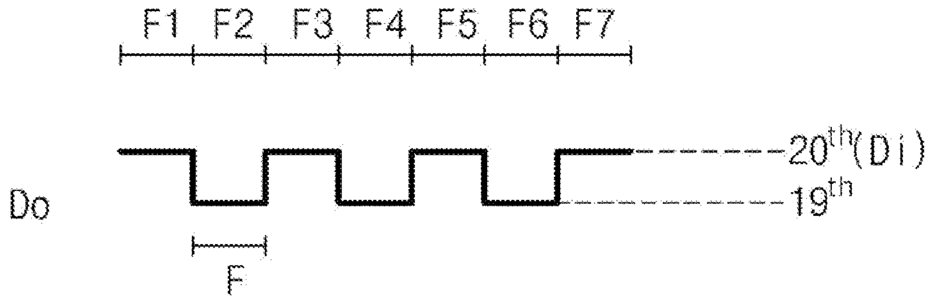
FIG. 5 is a view illustrating an example of a 1-bit-division time dithering compensation operation according to an embodiment of the present disclosure.

FIG. 5 is a view illustrating an example of a 1-bit-division time dithering compensation operation according to an embodiment of the present disclosure. Particularly, FIG. 5 shows a case, where the crosstalk level HXT is +1% and the luminance of the crosstalk occurrence region is increased, and the input image data Di of the crosstalk occurrence region have $20^{th}$ gray level, by way of example.

The crosstalk level HXT has an absolute value of 1%, so that the dithering bit is set to 1 bit. Since the dithering bit is 1 bit, the gray level range for the dithering has two gray levels, for example, gray levels of 0-1.

Since the crosstalk level HXT has a "+" (i.e., positive) value, to compensate for this, the time dithering is performed to lower the gray level of the crosstalk occurrence region.

In this regard, the dithering portion 320 can perform the dithering processing in which the gray level of the compensation image data Do decreases gradually by frame F and increases gradually by frame F with the decrease and increase repeated. In this regard, for example, in a first frame F1, the $20^{th}$ gray level, which is the gray level of the input image data Di, is left unchanged and the compensation image data Do with the $20^{th}$ gray level is output.

Next, in a second frame F2, the gray level output in the previous first frame F1 is reduced by one level to output the compensation image data Do with the $19^{th}$ gray level. Next, in a third frame F3, the gray level output in the previous second frame F2 is increased again to output the compensation image data Do with the $20^{th}$ gray level. Next, in a fourth frame F4, the gray level output in the previous third frame F3 is reduced again to output the compensation image data Do with the $19^{th}$ gray level.

The above time dithering processing can be performed repeatedly. Meanwhile, the time dithering operation can be continuously performed until a change of the image (e.g., change of the crosstalk pattern, removal of the crosstalk pattern, etc.) occurs.

Figure 6:
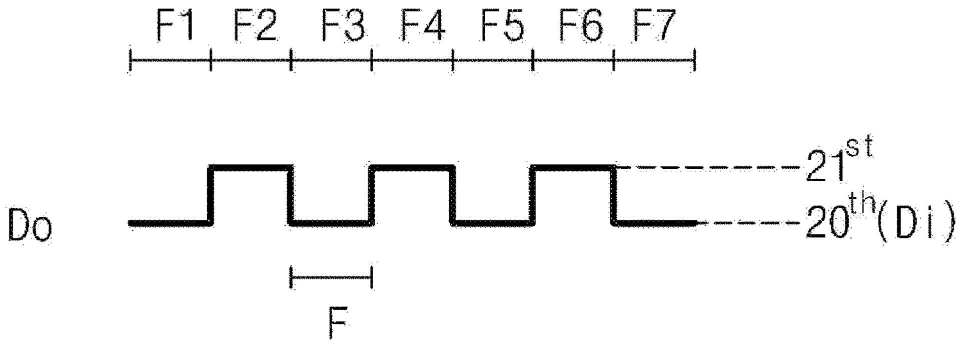
FIG. 6 is a view illustrating another example of a 1-bit-division time dithering compensation operation according to an embodiment of the present disclosure.

FIG. 6 is a view illustrating another example of a 1-bit-division time dithering compensation operation according to an embodiment of the present disclosure.

Contrary to the case of FIG. 5, FIG. 6 shows a case, where the crosstalk level HXT is −1% and the luminance of the crosstalk occurrence region is lowered, and the input image data Di of the crosstalk occurrence region have $20^{th}$ gray level, by way of example.

In the case of FIG. 6, as in the case of FIG. 5, the crosstalk level HXT has an absolute value of 1%, so that the dithering bit is set to 1 bit. Accordingly, the dithering gray level range has two gray levels, for example, gray levels of 0-1.

Meanwhile, contrary to the case of FIG. 5, since the crosstalk level (HXT) has a "−" (i.e., negative) value, to compensate for this, the time dithering is performed to increase the gray level of the crosstalk occurrence region. In this regard, the dithering portion 320 can perform the dithering processing in which the gray level of the compensation image data Do increases gradually by frame F and decreases gradually by frame F with the increase and decrease repeated.

In this regard, for example, in a first frame F1, the $20^{th}$ gray level, which is the gray level of the input image data Di, is left unchanged and the compensation image data Do with the $20^{th}$ gray level is output.

Next, in a second frame F2, the gray level output in the previous first frame F1 is increased by one level to output the compensation image data Do with the $21^{st}$ gray level. Next, in a third frame F3, the gray level output in the previous second frame F2 is reduced again to output the compensation image data Do with the $20^{th}$ gray level. Next, in a fourth frame F4, the gray level output in the previous third frame F3 is increased again to output the compensation image data Do with the $21^{st}$ gray level.

The above time dithering processing can be performed repeatedly. Meanwhile, the time dithering operation can be continuously performed until a change of the image occurs.

Figure 7:
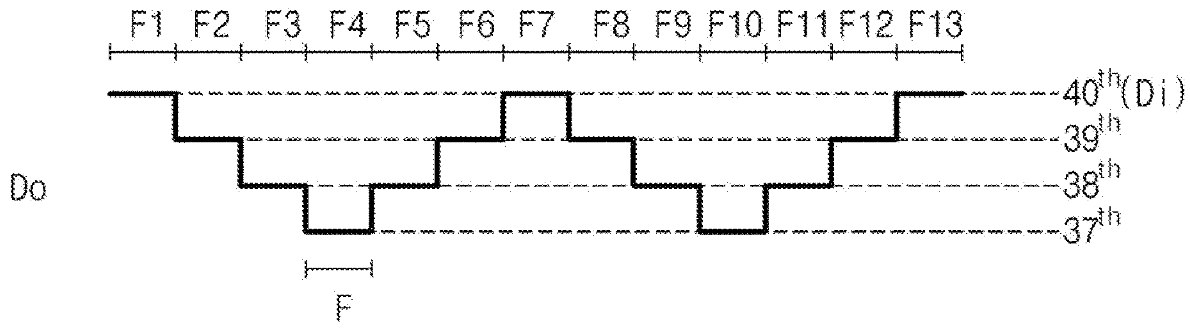
FIG. 7 is a view illustrating an example of a 2-bit-division time dithering compensation operation according to an embodiment of the present disclosure.

FIG. 7 is a view illustrating an example of a 2-bit-division time dithering compensation operation according to an embodiment of the present disclosure. Particularly, FIG. 7 shows a case, where the crosstalk level HXT is +2% and the luminance of the crosstalk occurrence region is increased, and the input image data Di of the crosstalk occurrence region have $40^{th}$ gray level, by way of example.

Since the crosstalk level HXT has an absolute value of 2%, the dithering bit is set to 2 bits. Since the dithering bit is 2 bits, the dithering gray level range has 4 gray levels, for example, gray levels of 0-3.

Since the crosstalk level HXT has a "+" value, to compensate for this, the time dithering is performed to lower the gray level of the crosstalk occurrence region. In this regard, the dithering portion 320 can perform the dithering processing in which the gray level of the compensation image data Do decreases gradually by frame F and increases gradually by frame F with the decrease and increase repeated.

In this regard, for example, in a first frame F1, the $40^{th}$ gray scale, which is the gray level of the input image data Di, is left unchanged and the compensation image data Do with the $40^{th}$ gray level is output.

Next, in a second frame F2, the gray level output in the previous first frame F1 is reduced by one level to output the compensation image data Do with the $39^{th}$ gray level. Next, in a third frame F3, the gray level output in the previous second frame F2 is reduced by one level to output the compensation image data Do with the $38^{th}$ gray level. Next, in a fourth frame F4, the gray level output in the previous third frame F3 is reduced by one level to output the compensation image data Do with the $37^{th}$ gray level. Next, in a fifth frame F5, the gray level output in the previous fourth frame F4 is increased by one level to output the compensation image data Do with the $38^{th}$ gray level.

Next, in a sixth frame F6, the gray level output in the previous fifth frame F5 is increased by one level to output the compensation image data Do with the $39^{th}$ gray level. Next, in a seventh frame F7, the gray level output in the previous sixth frame F6 is increased by one level to output the compensation image data Do with the $40^{th}$ gray level. Next, in an eighth frame F8, the gray level output in the previous seventh frame F7 is reduced by one level to output the compensation image data Do with the $39^{th}$ gray level.

The above time dithering processing can be performed repeatedly.

Meanwhile, contrary to the case of FIG. 7, in a case where the crosstalk level HXT is −2% and the luminance of the crosstalk occurrence region is lowered, the dithering compensation operation opposite to the case of FIG. 7 can be performed.

Figure 8:
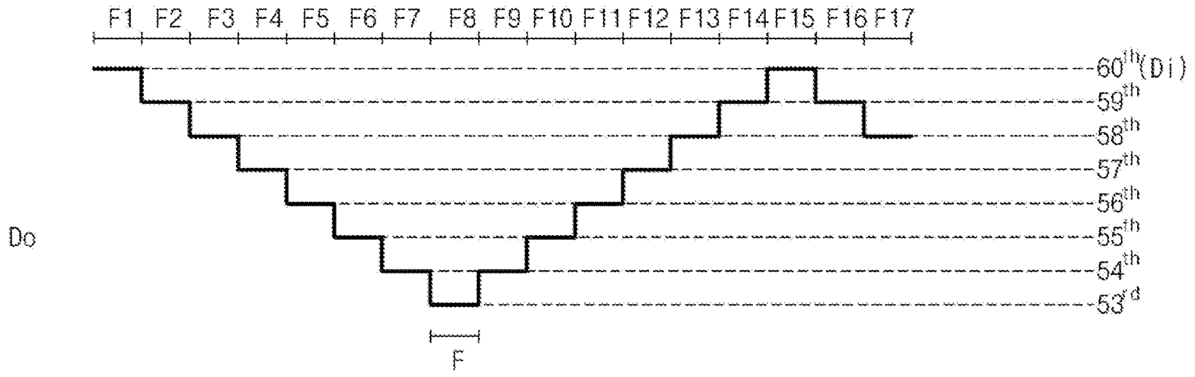
FIG. 8 is a view illustrating an example of a 3-bit-division time dithering compensation operation according to an embodiment of the present disclosure.

FIG. 8 is a view illustrating an example of a 3-bit-division time dithering compensation operation according to an embodiment of the present disclosure. Particularly, FIG. 8 shows a case, where the crosstalk level HXT is +3% and the luminance of the crosstalk occurrence region is increased, and the input image data Di of the crosstalk occurrence region have $60^{th}$ gray level, by way of example.

Since the crosstalk level HXT has an absolute value of 3%, the dithering bit is set to 3 bits.

Since the dithering bit is 3 bits, the dithering gray level range has 8 gray levels, for example, gray levels of 0-7.

Since the crosstalk level HXT has a "+" value, to compensate for this, the time dithering is performed to lower the gray level of the crosstalk occurrence region. In this regard, the dithering portion 320 can perform the dithering processing in which the gray level of the compensation image data Do decreases gradually by frame F and increases gradually by frame F with the decrease and increase repeated.

In this regard, for example, in a first frame F1, the $60^{th}$ gray level, which is the gray level of the input image data Di, is left unchanged and the compensation image data Do with the $60^{th}$ gray level is output.

Next, in a second frame F2, the gray level output in the previous first frame F1 is reduced by one level to output the compensation image data Do with the $59^{th}$ gray level. In this manner, the compensation image data Do are output by gradually reducing the gray level from third to eighth frames F3 to F8.

Next, in a ninth frame F9, the gray level output in the previous eighth frame F8 is increased by one level to output the compensation image data Do with the $54^{th}$ gray level. Next, in a tenth frame F10, the gray level output in the previous ninth frame F9 is increased by one level to output the compensation image data Do with the $55^{th}$ gray level. In this manner, the compensation image data Do are output by gradually increasing the gray level from the eleventh to the fifth frames F11 to F15.

The above time dithering processing can be performed repeatedly.

Meanwhile, contrary to the case of FIG. 8, in a case where the crosstalk level HXT is −3% and the luminance of the crosstalk occurrence region is lowered, the dithering compensation operation opposite to the case of FIG. 8 can be performed.

Figure 9:
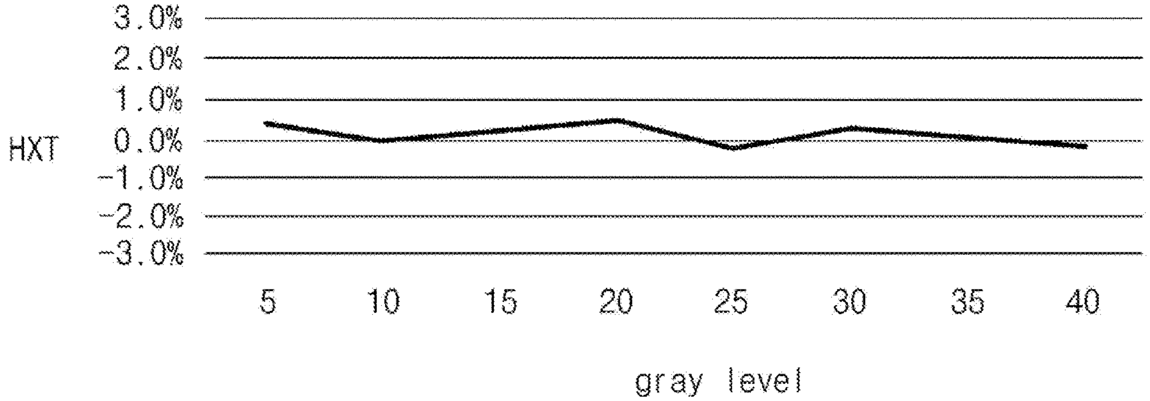
FIG. 9 is a view illustrating a result of a crosstalk compensation experiment using a bit-division time dithering method according to an embodiment of the present disclosure.

FIG. 9 is a view illustrating a result of a crosstalk compensation experiment using a bit-division time dithering method according to an embodiment of the present disclosure. In FIG. 9, crosstalk compensation characteristics for relatively low gray levels, $5^{th}$ to $40^{th}$ gray levels, are tested.

Referring to FIG. 9, it can be seen that as the crosstalk compensation is performed using the bit-division time dithering method of this embodiment for the crosstalk occurrence region, the crosstalk level after compensation substantially converges to 0%. As such, according to this embodiment, it can be seen that the crosstalk of low gray level is effectively compensated.

As described above, according to the embodiments of the present disclosure, depending on the crosstalk level of the crosstalk pattern, the gray level of image data can be divided with the dithering bit of the corresponding resolution.

Further, according to the embodiments of the present disclosure, due to a nature of the time dithering method, the time dithering method enables detailed and natural (or smooth) gradation expression (or luminance expression), so that crosstalk can be compensated in a detailed and natural way, thereby improving a crosstalk compensation ability.

Furthermore, according to the embodiments of the present disclosure, by performing the crosstalk compensation using the time dithering method for low gray levels where a change of gray level is perceived sensitively, the low gray level crosstalk can be effectively compensated.

It will be apparent to those skilled in the art that various modifications and variation can be made in the present disclosure without departing from the spirit or scope of the disclosure. Thus, it is intended that the present disclosure cover the modifications and variations of this disclosure provided they come within the scope of the appended claims and their equivalents.

What is claimed is:

1. A display apparatus, comprising:

a display panel configured to display an image;

an image analysis portion configured to calculate a crosstalk level when a crosstalk pattern exists in the image; and a dithering portion configured to set a dithering bit corresponding to the crosstalk level, and perform a time dithering processing with the dithering bit on input image data located in a region where a crosstalk occurs by the crosstalk pattern, to generate compensation image data, wherein the time dithering processing is performed to lower a gray level of the region where the crosstalk occurs when the crosstalk level has a positive value, and is performed to increase the gray level of the region where the crosstalk occurs when the crosstalk level has a negative value.

2. The display apparatus of claim 1, wherein a number of the dithering bit increases as an absolute value of the crosstalk level increases.

3. The display apparatus of claim 1, wherein a number of the dithering bit is equal to an absolute value of the crosstalk level in percentage.

4. The display apparatus of claim 1, wherein a number of the dithering bit is up to 3.

5. The display apparatus of claim 1, wherein the time dithering processing is performed based on a gray level of the input image data.

6. The display apparatus of claim 1, wherein the image analysis portion includes a lookup table in which the crosstalk level for each crosstalk pattern is defined.

7. The display apparatus of claim 1, wherein a gray level of the input image data subjected to the time dithering processing is 50% or less of a maximum gray level that the input image data is configured to express.

8. The display apparatus of claim 1, wherein the display panel is an organic light emitting display panel.

9. The display apparatus of claim 1, wherein when the dithering bit is n, a gray level range for the time dithering processing is $2^n$, and wherein the crosstalk level has the positive value, a gray level of the compensation image data decreases from a gray level of the input image data gradually by one gray level within the gray level range and then increases to the gray level of the input image data gradually by one gray level within the gray level range, and wherein the crosstalk level has the negative value, the gray level of the compensation image data increases from the gray level of the input image data gradually by one gray level within the gray level range and then decreases to the gray level of the input image data gradually by one gray level within the gray level range.

10. A display apparatus, comprising:

a display panel configured to display an image; and a data compensation portion configured to perform a time dithering processing on input image data in a crosstalk occurrence region with a dithering bit which is set according to a crosstalk level in the image, to generate compensation image data, wherein the time dithering processing is performed to lower a gray level of the crosstalk occurrence region when the crosstalk level has a positive value, and is performed to increase the gray level of the crosstalk occurrence region when the crosstalk level has a negative value.

11. The display apparatus of claim 10, wherein a number of the dithering bit increases as an absolute value of the crosstalk level increases.

12. The display apparatus of claim 10, wherein a number of the dithering bit is equal to an absolute value of the crosstalk level in percentage.

13. The display apparatus of claim 10, wherein a number of the dithering bit is up to 3.

14. The display apparatus of claim 10, wherein the time dithering processing is performed based on a gray level of the input image data.

15. The display apparatus of claim 10, wherein the data compensation portion includes a lookup table in which the crosstalk level for each crosstalk pattern is defined.

16. The display apparatus of claim 10, wherein a gray level of the input image data subjected to the time dithering processing is 50% or less of a maximum gray level that the input image data can express.

17. The display apparatus of claim 10, wherein the display panel is an organic light emitting display panel.

18. The display apparatus of claim 10, wherein when the dithering bit is n, a gray level range for the time dithering processing is $2^n$, and wherein the crosstalk level has the positive value, a gray level of the compensation image data decreases from a gray level of the input image data gradually by one gray level within the gray level range and then increases to the gray level of the input image data gradually by one gray level within the gray level range, and wherein the crosstalk level has the negative value, the gray level of the compensation image data increases from the gray level of the input image data gradually by one gray level within the gray level range and then decreases to the gray level of the input image data gradually by one gray level within the gray level range.

* * * * *